US 8,611,285 B2

(12) United States Patent
Henning et al.

(10) Patent No.: US 8,611,285 B2
(45) Date of Patent: Dec. 17, 2013

(54) METHOD AND SYSTEM FOR MANAGING VIDEO DATA BASED ON A PREDICTED NEXT CHANNEL SELECTION

(75) Inventors: Mikael Henning, Malmö (SE); Markus Andreasson, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1454 days.

(21) Appl. No.: 11/379,127

(22) Filed: Apr. 18, 2006

(65) Prior Publication Data

US 2007/0263066 A1  Nov. 15, 2007

(51) Int. Cl.
H04W 4/00 (2009.01)

(52) U.S. Cl.
USPC ........... 370/329; 370/341; 370/437; 455/566; 455/452.2; 348/14.02; 348/731; 348/732; 725/62

(58) Field of Classification Search
USPC .......... 345/158, 169; 348/565, 725, 727, 731, 348/732, 14.02; 455/179.1, 185.1, 186.1, 455/186.2, 187.1, 191.1, 452.2, 566; 370/329, 341, 389, 437; 725/62
See application file for complete search history.

(56) References Cited

U.S. PATENT DOCUMENTS

| | | | | |
|---|---|---|---|---|
| 4,931,865 | A * | 6/1990 | Scarampi | 725/12 |
| 5,933,192 | A | 8/1999 | Crosby et al. | |
| 6,591,013 | B1 | 7/2003 | Taunton | |
| 6,985,188 | B1 * | 1/2006 | Hurst, Jr. | 348/553 |
| 2004/0001500 | A1 * | 1/2004 | Castillo | 370/437 |
| 2004/0128317 | A1 * | 7/2004 | Sull et al. | 707/104.1 |
| 2005/0149975 | A1 * | 7/2005 | Jutzi | 725/95 |
| 2006/0161952 | A1 * | 7/2006 | Herz et al. | 725/46 |
| 2007/0188665 | A1 * | 8/2007 | Watson et al. | 348/731 |

FOREIGN PATENT DOCUMENTS

| | | |
|---|---|---|
| EP | 1 107 601 | 6/2001 |
| EP | 1107601 A2 | 6/2001 |
| JP | 2001-094892 | 4/2001 |
| JP | 2003-051998 | 2/2003 |
| JP | 2005-130087 | 5/2005 |
| JP | 2005-284978 | 10/2005 |
| JP | 2005-354283 | 12/2005 |

(Continued)

OTHER PUBLICATIONS

International Search Report from corresponding International Application No. PCT/IB2006/002901.

(Continued)

*Primary Examiner* — Anthony Addy
*Assistant Examiner* — Amanuel Lebassi
(74) *Attorney, Agent, or Firm* — Renner, Otto, Boisselle & Sklar, LLP (57) ABSTRACT

A method of processing video data with an electronic equipment where the video data is available from a time-sliced data stream having video data corresponding to each of a plurality of channels. The method includes receiving video data corresponding to one of the channels from the plurality of channels that is currently selected by the user and driving a display in accordance with the video data corresponding to the currently selected channel, and predicting which one of the remaining channels from the plurality of channels that the user may next select. Video data corresponding to the predicted channel is received and buffered to improve switching time from the currently selected channel to the predicted next channel.

20 Claims, 3 Drawing Sheets

(56) References Cited

FOREIGN PATENT DOCUMENTS

| KR | 2001-0060382 | 7/2001 |
| WO | 2004/086656 | 10/2004 |
| WO | 2005/060113 | 6/2005 |

OTHER PUBLICATIONS

International Preliminary Report on Patentability from corresponding International Application No. PCT/IB06/002901.

* cited by examiner

METHOD AND SYSTEM FOR MANAGING VIDEO DATA BASED ON A PREDICTED NEXT CHANNEL SELECTION

TECHNICAL FIELD OF THE INVENTION

The present invention relates generally to electronic equipment, such as electronic equipment for engaging in voice communications and/or for playing back audiovisual content to a user. More particularly, the invention relates to a method and system for managing video data based on a predicted next channel selection to improve switching from one channel to another.

DESCRIPTION OF THE RELATED ART

Mobile and/or wireless items of electronic equipment are becoming increasingly popular. For example, mobile telephones are now in wide-spread use. In addition, the features associated with certain types of electronic equipment have become increasingly diverse. To name a few examples, many electronic equipment include cameras, text messaging capability, Internet browsing functionality, electronic mail capability, video playback capability, audio playback capability, image display capability and hands-free headset interfaces.

Some items of electronic equipment include mobile television and/or mobile radio capability. For example, mobile items of electronic equipment may be able to receive and display video content, along with outputting associated audio content. For instance, such electronic equipment may be compatible with the Digital Video Broadcasting-Handheld (DVB-H) standard for bringing broadcast services to handheld receivers. The DVB-H standard was formally adopted as ETSI standard EN 302 304 in November 2004 and is herein incorporated by reference in its entirety.

DVB-H, which falls within the set of DVB transmission standards, adapts the DVB-T system for digital terrestrial television for use with handheld, battery-powered devices. DVB-H can offer a downstream channel at high data rates for use by standalone devices or as an enhancement to mobile telecommunications networks. As will be appreciated, mobile telecommunications networks are traditionally used to provide services such as telephone communications, messaging and/or Internet access to various items of electronic equipment.

DVB-H employs time slicing technology to reduce power consumption by the receiving device. Time slicing under DVB-H involves transmitting IP datagrams as data bursts in time slots. The front end of a DVB-H compatible receiver switches on only for the time interval when the data burst of a selected service is on air. When watching television, for example, the selected service may correspond to the channel or program that the user wishes to watch. Within the short period of time corresponding to the time slots for the selected service, data is received. The data may be stored in a buffer and then passed to a decoder for generation of a video signal that may, in turn, be used to drive a display for presentation of video content to a user. There are often about ten or more bursted services in a DVB-H stream and the receiver is synchronized to receive and buffer a user selected one of the services. By ignoring the remaining services, the receiving device may save considerable battery resources. The term IP datacast is used to refer to the technical elements to create DVB-H based services and those that are used to integrate DVB-H in a hybrid network structure having both a mobile communications network such as general packet radio service (GPRS) or universal mobile telephone service (UMTS) and an additional DVB-H downstream.

DVB-H and similar downstreaming techniques, however, suffer from delays when switching from one channel to another. This delay detracts from the user experience.

SUMMARY

Aspects of the present invention are directed to reducing the amount of time that the user may have to wait before being able to view a video presentation associated with a newly selected service.

According to one aspect of the invention, a method of processing video data with an electronic equipment, the video data available from a time-sliced data stream having video data corresponding to each of a plurality of channels includes receiving video data corresponding to one of the channels from the plurality of channels that is currently selected by the user and driving a display in accordance with the video data corresponding to the currently selected channel; predicting which one of the remaining channels from the plurality of channels that the user may next select; and receiving and buffering video data corresponding to the predicted channel.

According to another aspect, the method further includes, upon user action to switch from the currently selected channel to a newly selected one of the channels, determining if the newly selected channel is the predicted channel and, if so, driving the display in accordance with the buffered data corresponding to the predicted channel, repeating a) using the predicted channel as the currently selected channel and repeating b) and c); else repeating a) using the newly selected channel as the currently selected channel and repeating b) and c).

According to another aspect, the method further includes deleting aged buffered data corresponding to the predicted channel.

According to another aspect, the predicting monitors user behavior to determine which of plural prediction techniques to use to establish the predicted next channel.

According to another aspect, the predicting includes separately predicting a predicted next channel with each of plural prediction techniques and making a predicted next channel determination as a function of the separately predicted next channels.

According to another aspect, the predicting uses a channel selected immediately before the currently selected channel as the predicted next channel.

According to another aspect, the predicting includes monitoring user channel selection behavior for patterns in channel selection.

According to another aspect, the predicting includes monitoring accumulated view time of each channel.

According to another aspect, the predicting include monitoring a frequency with which the user selects each channel.

According to another aspect, the predicting uses content of the video data associated with each channel to determine the predicted next channel.

According to another aspect, the predicting includes reducing a possible number of potential predicted next channels using a configuration of a user interface for selecting a next channel.

According to another aspect, the predicting uses channel popularity ratings to determine the predicted next channel.

According to another aspect, the electronic equipment is a mobile telephone.

According to yet another aspect of the invention, an electronic equipment includes a receiver for receiving video data corresponding to a channel selected by a user from a plurality of channels, each channel having corresponding video data available from a time-sliced data stream; a display for displaying video content in accordance with the video data corresponding to the currently selected channel; a controller for predicting which one of the remaining channels from the plurality of channels that the user may next select; and a buffer for buffering video data corresponding to the predicted channel.

According to another aspect, the electronic equipment is a mobile telephone.

According to another aspect, the electronic equipment further includes a video data decoder configured to decode the buffered video data and generate a video signal corresponding to the buffered video data for the predicted channel following a detection of a user input to switch from the currently selected channel to the predicted next channel, the video signal for driving the display.

According to still another aspect of the invention, a program stored on a machine usable medium for managing the processing video data with an electronic equipment, the video data available from a time-sliced data stream having video data corresponding to each of a plurality of channels, includes executable logic to control a receiver to receive video data corresponding to one of the channels from the plurality of channels that is currently selected by the user and control a decoder to generate a video signal in accordance with the video data corresponding to the currently selected channel for driving a display; predict which one of the remaining channels from the plurality of channels that the user may next select; and control the receiver to receive video data corresponding to the predicted channel and logic to control a buffer to buffer the video data corresponding to the predicted channel.

According to another aspect, the program further includes logic to determine if a newly selected channel is the predicted channel upon user action to switch from the currently selected channel to a newly selected one of the channels, and, if so, control the decoder to generate a video signal in accordance with the buffered data corresponding to the predicted channel.

According to another aspect, the logic to predict monitors user behavior to determine which of plural prediction techniques to use to establish the predicted next channel.

According to another aspect, the logic to predict separately predicts a predicted next channel with each of plural prediction techniques and makes a predicted next channel determination as a function of the separately predicted next channels.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

The present invention will now be described with reference to the drawings, wherein like reference numerals are used to refer to like elements throughout.

The term "electronic equipment" includes portable radio communication equipment. The term "portable radio communication equipment," which herein after is referred to as a "mobile radio terminal," includes all equipment such as mobile telephones, pagers, communicators, i.e., electronic organizers, personal digital assistants (PDAs), smartphones, portable communication apparatus or the like.

In the present application, the invention is described primarily in the context of a mobile telephone. However, it will be appreciated that the invention is not intended to be limited to a mobile telephone and can be any type of appropriate electronic equipment. Other exemplary types of electronic equipment that may benefit from aspects of the present invention include audio and/or video playback devices (e.g., MP3 players, DVD players, etc.) having mobile television and/or radio receiving capability.

Figure 1:
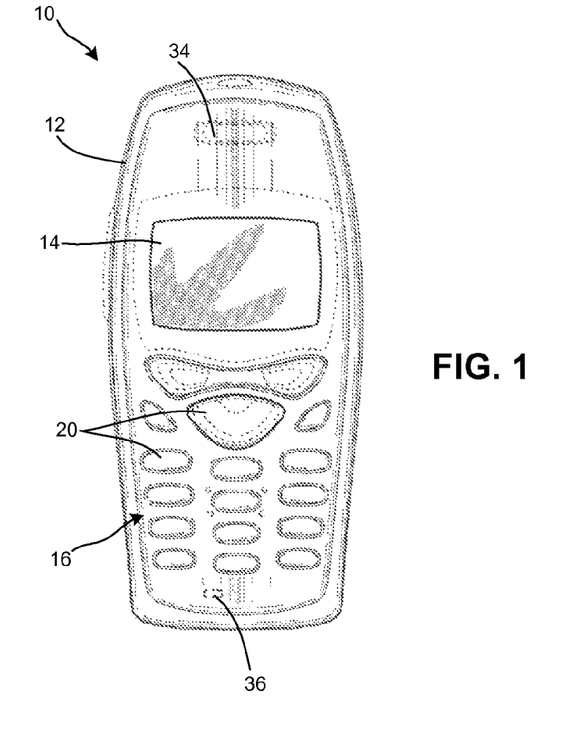
FIG. 1 is a schematic view of a mobile telephone as an exemplary electronic equipment in accordance with an embodiment of the present invention.

Referring initially to FIG. 1, an electronic equipment 10 is shown in accordance with the present invention. The electronic equipment includes a channel prediction function that is configured to predict a channel from two or more channel possibilities that a user may next select to view, and buffer data associated with the predicted channel to improve switching (sometime referred to as "zapping") from the currently selected channel to the predicted channel. It will be appreciated that the channel prediction function may be embodied as executable code that may be resident in the electronic equipment 10.

The term channel will be used to broadly mean any one of multiple broadcast services that may be received by the electronic equipment. Accordingly, each channel may correspond to a television station or a radio station. Channels may also correspond to a set of programs offered by a television, video, radio, music and/or other content service (e.g., there may be one service provider that offers a number of programs, such as in the form of a play list).

In one embodiment, plural channels are broadcast to the electronic equipment 10 using a time slice protocol, such as DVB-H. Under the DVB-H standard, each channel may be referred to as a service. The time slice protocol may involve transmitting IP datagrams for each channel as data bursts in corresponding time slots.

Figure 2:
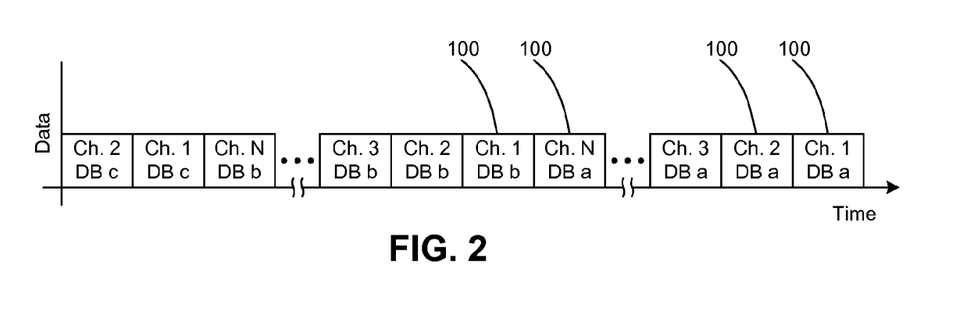
FIG. 2 is a time line showing data bursts delivered in time sliced arrangement.

With additional reference to FIG. 2, a series of time sliced data bursts 100 for plural channels is illustrated. In the data transmission sequence, a first data burst (DB a) for a first channel (Ch. 1) is followed by a first data burst (DB a) for a second channel (Ch. 2), which is followed by a first data burst (DB a) for a third channel (Ch. 3). The string of first data bursts (DB a) continues until the last channel (Ch. N) is reached, after which a second data burst (DB b) for each channel is sequentially transmitted and then a third data burst (DB c) for each channel is sequentially transmitted, and so on.

A receiver of the electronic equipment 10 may be "tuned" to one of the channels. The channel to which the receiver is tuned is typically selected by the user. The receiver is configured to be synchronized to the data bursts of the selected channel. The data bursts for the selected channel are received by the receiver, buffered and decoded so that a displayable video signal and associated audio signal are generated, but the remaining data bursts are ignored. To generate the video and audio signals, the data bursts for the selected channel are assembled to effectively bridge the time elapsing between data bursts for the selected channel and during which data bursts for other channels are transmitted.

In the description herein, the transmitted and processed data is audiovisual data. It will be understood that other data formats may be transmitted in time sliced manner, such as audio data, image data, files, software programs, etc., and aspects of the present invention may be applied to the processing of data formats other than audiovisual data.

With continued reference to FIG. 1, the illustrated electronic equipment 10 is a portable, battery powered device. The electronic equipment in the exemplary embodiment is a mobile telephone and will be referred to as the mobile telephone 10. The mobile telephone 10 is shown as having a "brick" or "block" design type housing 12, but it will be appreciated that other type housings, such as a clamshell housing or a slide-type housing, may be utilized without departing from the scope of the invention.

The mobile telephone 10 includes a display 14 and keypad 16. As is conventional, the display 14 displays information to a user such as operating state, time, telephone numbers, contact information, various navigational menus, etc., which enable the user to utilize the various feature of the mobile telephone 10. The display 14 may also be used to visually display content received by the mobile telephone 10 and/or retrieved from a memory 18 (FIG. 3) of the mobile telephone 10.

Similarly, the keypad 16 may be conventional in that it provides for a variety of user input operations. For example, the keypad 16 typically includes alphanumeric keys 20 for allowing entry of alphanumeric information such as telephone numbers, phone lists, contact information, notes, etc. In addition, the keypad 16 typically includes special function keys such as a "call send" key for initiating or answering a call, and a "call end" key for ending, or "hanging up" a call. Special function keys may also include menu navigation keys, for example, for navigating through a menu displayed on the display 14 to select different telephone functions, profiles, settings, etc., as is conventional. Other keys associated with the mobile telephone may include a volume key, audio mute key, an on/off power key, a web browser launch key, a camera key, etc. Keys or key-like functionality may also be embodied as a touch screen associated with the display 14.

The mobile telephone 10 includes conventional call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc.

Figure 3:
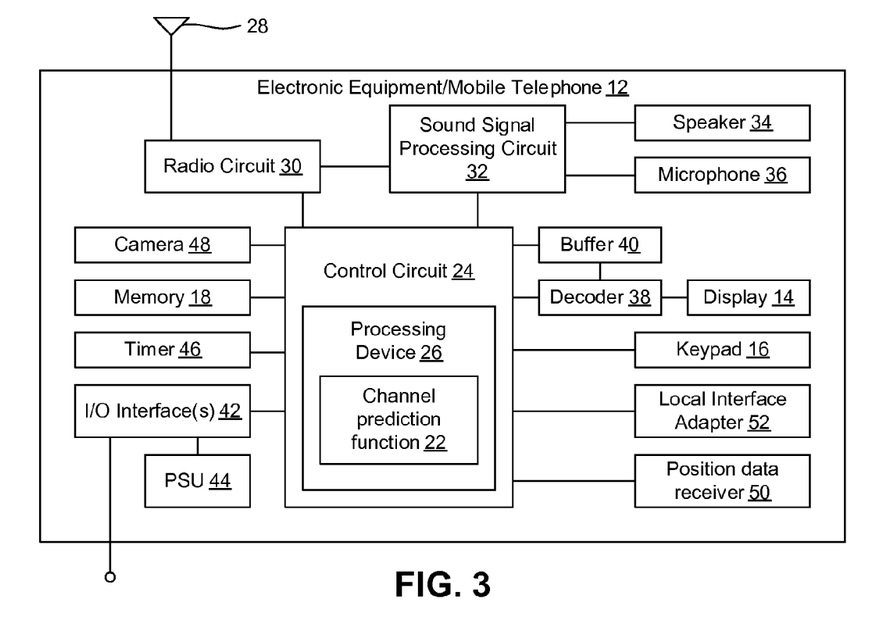
FIG. 3 is a schematic block diagram of the relevant portions of the mobile telephone of FIG. 1 in accordance with an embodiment of the present invention.

FIG. 3 represents a functional block diagram of the mobile telephone 10. With the exception of a channel prediction function 22 according to the present invention, which is preferably implemented as executable logic in the form of application software or code within the mobile telephone 10, the construction of the mobile telephone 10 is otherwise generally conventional. The mobile telephone 10 includes a primary control circuit 24 that is configured to carry out overall control of the functions and operations of the mobile telephone 10. The control circuit 24 may include a processing device 26, such as a CPU, microcontroller or microprocessor. The processing device 26 executes code stored in a memory (not shown) within the control circuit 24 and/or in a separate memory, such as memory 18, in order to carry out conventional operation of the mobile telephone 10. The memory 18 may be, for example, one or more of a buffer, a flash memory, a hard drive, a removable media, a volatile memory, a non-volatile memory or other suitable device. In addition, the processing device 26 executes code in accordance with the present invention in order to perform the channel prediction function 22.

It will be apparent to a person having ordinary skill in the art of computer programming, and specifically in applications programming for mobile telephones or other items of electronic equipment, how to program a mobile telephone 10 to operate and carry out the functions described herein. Accordingly, details as to the specific programming code have been left out for sake of brevity. Also, while the channel prediction function 22 is executed by the processing device 26 in accordance with the preferred embodiment of the invention, such functionality could also be carried out via dedicated hardware, firmware, software, or combinations thereof, without departing from the scope of the invention.

Continuing to refer to FIGS. 1 through 3, the mobile telephone 10 includes an antenna 28 coupled to a radio circuit 30. The radio circuit 30 includes a radio frequency transmitter and receiver for transmitting and receiving signals via the antenna 28 as is conventional. The radio circuit 30 may be configured to operate in a mobile communications network, as well as to receive time sliced datagrams or other data transmissions. For example, the receiver may be an IP datacast compatible receiver compatible with a hybrid network structure providing mobile communications and DVB-H based or similar services.

The mobile telephone 10 further includes a sound signal processing circuit 32 for processing the audio signal transmitted by/received from the radio circuit 30. Coupled to the sound processing circuit 32 are a speaker 34 and a microphone 36 that enable a user to listen and speak via the mobile telephone 10 as is conventional. The radio circuit 30 and sound processing circuit 32 are each coupled to the control circuit 24 so as to carry out overall operation.

The mobile telephone 10 also includes the aforementioned display 14 and keypad 16 coupled to the control circuit 24. The display 14 may be coupled to the control circuit 24 by a video decoder 38 that converts video data to a video signal used to drive the display 14. The video data may be retrieved from a video file that is stored in the memory 18 or from received video data. Prior to being feed to the decoder 38, the video data may be buffered in a buffer 40.

The mobile telephone 10 further includes one or more I/O interface(s) 42. The I/O interface(s) 42 may be in the form of typical mobile telephone I/O interfaces and may include one or more electrical connectors. As is typical, the I/O interface(s) 42 may be used to couple the mobile telephone 10 to a battery charger to charge a battery of a power supply unit (PSU) 44 within the mobile telephone 10. In addition, or in the alternative, the I/O interface(s) 42 may serve to connect the mobile telephone 10 to a wired personal hands-free adaptor (not shown). Further, the I/O interface(s) 42 may serve to connect the mobile telephone 10 to a personal computer or other device via a data cable or wireless link, etc. The mobile telephone 10 may receive operating power via the I/O interface(s) 42 when connected to a vehicle power adapter or an electricity outlet power adapter.

The mobile telephone 10 may also include a timer 46 for carrying out timing functions. Such functions may include timing the durations of calls, generating the content of time and date stamps, etc.

As indicated, the mobile telephone 10 may be configured to operate in a communications system (not illustrated). The system can include a server or servers for managing calls placed by and destined to the mobile telephone 10, transmitting data to the mobile telephone 10 and carrying out any other support functions. The server communicates with the mobile telephone 10 via a network and a transmission medium. The transmission medium may be any appropriate device or assembly, including, for example, a communications tower, another mobile telephone, a wireless access point, a satellite, etc. Portions of the network may include wireless transmission pathways.

The mobile telephone 10 may include a camera 48 for taking digital pictures and/or movies. Image and/or video files corresponding to the pictures and/or movies may be stored in the memory 18.

The mobile telephone 10 also may include a position data receiver 50, such as a global positioning satellite (GPS) receiver, Galileo satellite system receiver or the like.

The mobile telephone 10 also may include a local wireless interface 52, such as a Bluetooth adaptor, for establishing communication with an accessory, hands-free adaptor, computer or other device.

Figure 4:
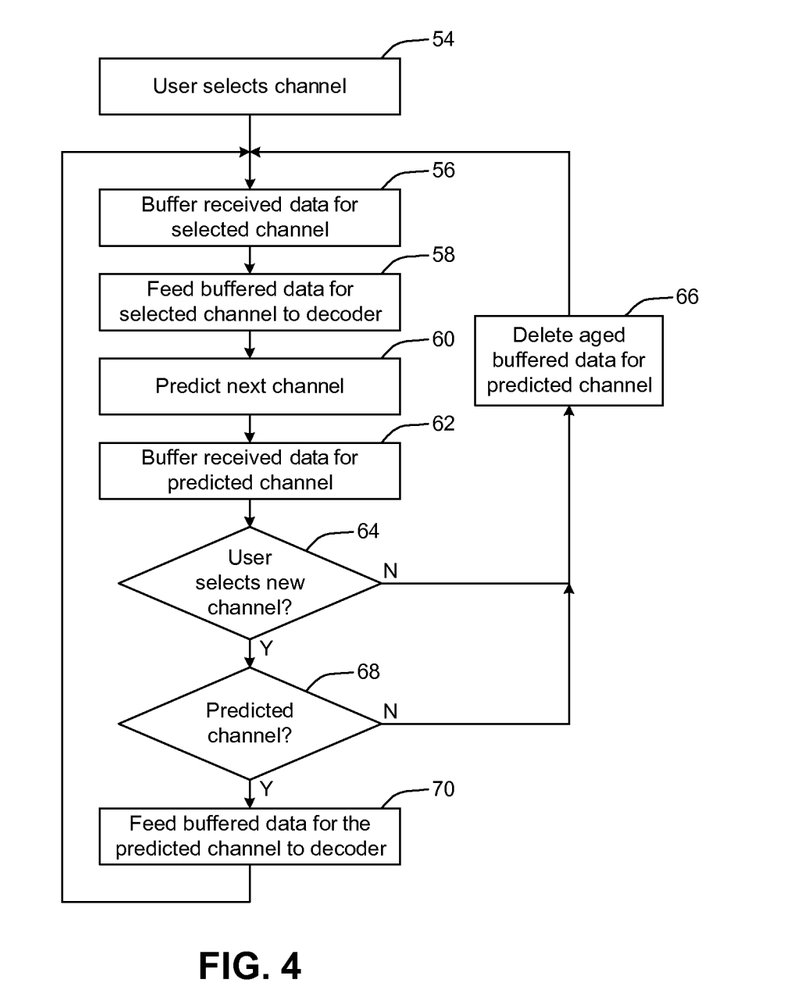
FIG. 4 is a flow chart of an exemplary channel prediction function carried out by the mobile telephone of FIG. 1 in accordance with an embodiment of the present invention.

Referring to FIG. 4, a method of predicting which channel that the user will select and buffering associated data is depicted. The functionality of the method may be carried out by the mobile telephone 10. For example, the functionality of the method may be embodied as executable code, such as in the form of the channel prediction function 22, or any other suitable form, including software, firmware, dedicated circuit components, computer readable media, machine usable medium and so forth.

Although the illustrated method shows a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores, or messages may be added to the logical flow for purposes of enhanced utility, accounting, performance, measurement, troubleshooting, and the like. It is understood that all such variations are within the scope of the present invention.

The illustrated method starts in block 54 where the user selects a channel. By way of example, the channel is selected so as to receive video data associated with the selected channel. As will be described below, the received video data associated with the selected channel is processed and presented as a video presentation on the display for viewing by the user.

In block 56, the received video data associated with the selected channel is buffered. The buffering of block 56 may occur by the buffer 40. In block 58, when a sufficient amount of video data is buffered, the buffered data associated with the selected channel may be feed to the decoder 38 for generation of a video signal. The video signal may be output to the display 14 or display driver for driving the display 14.

Similar to the processing of the video data, any audio data associated with the video data may be received, buffered, decoded (e.g., by the sound signal processing circuit 32) and used to drive the speaker 34 to output sounds. In another embodiment, audio data may be transmitted to an accessory (e.g., a hands-free headset) over a wireless local interface using the local interface adapter 52 so that the accessory outputs the sounds. As will be understood, the broadcasting of sounds may be synchronized with the displayed video.

As will become more apparent below, the receipt, buffering and decoding of incoming data associated with the selected channel will continue until the user selects a different channel.

As indicated above, there can be an appreciable delay (e.g., often on the order of about three seconds) from the time the user selects a different channel to when the video presentation corresponding to the newly selected channel is displayed on the display. In systems using DVB-H or other time slicing protocol, there is a great emphasis on using the receiver (e.g., radio circuit 30) to receive data corresponding to the selected channel and ignore other channels to conserve battery life. Since services are broadcast in time slot arrangement, however, switching from one channel to another channel may be time consuming. In particular, time elapses by waiting for the time slot of the newly selected channel to arrive and waiting for an acceptable amount of data to be buffered before decoding starts.

To reduce the delay, the method may proceed to block 60 where a prediction is made as to which channel may be next selected by the user. Predicting the next channel that the user may select to view may be carried in a number of different ways. Exemplary techniques for carrying out next channel prediction are described herein, but other techniques and/or modifications to the described techniques are possible and are considered to fall within the scope of the claims appended hereto. In one embodiment, the mobile telephone 10 relies on only one technique to predict the next channel selection. In other embodiments, the mobile telephone uses plural techniques to predict the next channel selection. For instance, user behavior may be monitored and one technique from multiple possible techniques is employed based on the monitored behavior (e.g., the techniques are placed in a hierarchy and based on current user behavior and/or current time and date, one technique may be used over another technique). In another embodiment, multiple techniques may be combined by merging the processes, user behavior monitoring and/or decision making algorithm of the techniques. In other embodiment, multiple techniques may be separately used to predict the next channel under each technique and the results of each technique may be combined using a weighting scheme to generate the next channel prediction of block 60.

One example technique for predicting the next channel is to use the channel selected immediately before the currently selected channel as the predicted next channel. This technique is based on an assumption that the user will return to the previously selected channel from the currently selected channel. This technique may work particularly well when monitoring of user behavior indicates that the user is switching back and forth between two channels. For instance, a user may interested in the content currently be aired by both channels and will switch at opportune times from one channel to the other and back to the first channel. If the user is switching between two channels, it is likely that the next time the user selects a different channel from the one currently viewed, the other of the two will be selected. This technique may be implemented by tracking user behavior and recognizing a pattern of switching back and forth between two channels.

Another example technique for predicting the next channel is to base the prediction on previous choices that the user has exhibited a propensity to make. For example, monitoring of user behavior may reveal that the user has a pattern (e.g., "modus operandi") when making channel selection, such as selecting from only a few channels from a larger number of available channels when attempting to find content of interest. If monitoring reveals that the channels tend to be selected in a particular order and/or with a particular frequency, the accuracy of this technique may be improved. Other associated behavior may be used under this technique, such as observing that once a user has briefly viewed a channel but then selects another channel, the briefly viewed channel is not typically selected again for a certain amount of time. Other observable behavior may include observing the types of channel selections that the user makes based on the time of day and/or day of the week. As will be appreciated, various additional and/or alternative statistical analysis techniques may be used to assess the user's behavior and make a next channel prediction.

In one embodiment, the particular channels of most interest to the user and/or the order of selection may result in the generation of a "favorites" style channel selection list by the mobile telephone 10. In a variation of the foregoing technique, the user may construct a list of favorite channels to view with an associated order. Different lists may be generated for different times of day and/or different days of the week. No matter how the list is generated, the prediction may be made based on the next channel from the list.

Another example technique involves monitoring the accumulated view time of each available channel. Monitoring accumulated view time may reveal that the user tends to watch certain channels over other channels. For instance, a score or percentage value may be associated with each channel. The channel with the highest score or percentage value (and which is not currently selected) may be predicted to be next selected channel. Accumulated view time may be measured by monitoring the length of time that the user has historically viewed each channel.

Another example technique involves monitoring the accumulated frequency with which the user has historically selected each available channel for viewing (e.g., the number of times each channel is selected independent of length of time watched). Monitoring accumulated selection frequency may reveal that the user tends to watch certain channels over other channels. For instance, a score or percentage value may be associated with each channel. The channel with the highest score or percentage value (and which is not currently selected) may be predicted to be next selected channel.

In another embodiment, the accumulated view time and the accumulated selection frequency from the preceding two example techniques may be combined to derive a score for each channel. Such a score may be predictive of the next channel by indicating the most frequently watched channels and the duration with which those channels are watched.

Another example technique includes using a content based metric. This technique is based on the assumption that a user is likely to return to particular programming that he or she views often or with regularity. For example, it is possible to monitor for user selection of recurring shows or program series. If a regularly watched show airs at a particular time on a daily or weekly basis and, when that time arrives, if the currently selected channel is not the channel on which that show airs, the predicted next channel may be the channel on which the show airs.

Another form of using a content based metric may be based on type of content and monitored behavior. For example, currently aired content and/or the type of content aired by each channel may be ranked against regularly watched types of programs, artists and/or actors to predict the next selected channel. Categories of regularly watched content and how often or frequently each are watched may be developed. An example set of categories could include sporting events in general, particular types of sports (e.g., football/soccer, American football, basketball, etc.), particular sporting teams, news programs in general, particular types of news programs (e.g., national news, local news, business and financial news, etc.), cooking shows, music videos, and so forth.

Another example technique may be based, at least in part, on limitations in the user interface. Some electronic equipment may be limited in how the user may select a channel. For instance, the user may be able to move up or down through an ordered list of channels, or select a next or previous item in a play list. Such selection schemes are more limited than when the user interface allows the user to select any available channel by "jumping" directly to the desired channel. The limitations in the user interface may reduce the number of possible next channels from which the prediction may be made. Any of the other techniques for next channel prediction described herein or other suitable technique may be used to predict the next channel from this reduced number of possible next channels. For example, a user's propensity to select channels in increasing order may be observed.

Another example technique may include using channel popularity ratings. This technique is based on the assumption that the more popular a channel is, the more likely the user is to select the channel. The channels may be ranked by popularity and the most popular channel that is not current selected may be used as the predicted next selection. This technique may use static or dynamic ratings. Static rating may be used to rank each channel according to overall viewership across all time slots. Dynamic ratings may be used to rank each channel according to viewership at the particular time to take into consideration the popularity of the currently aired content. Therefore, dynamic ratings would place the most popular channel for the particular time ahead of other channels, even if that channel is not as popular at other times.

Demographic information may also be used in ranking the channels by popularity and/or some other metric. For example, if the user is male and between the ages of 16 and 24, the most popular channels for such an individual may differ from the most popular channels for a female between the ages of 45 and 60.

As indicated, the channel prediction technique used at any particular time may be selected based on monitored user behavior, time of day and/or day of the week, etc. Aspects from one or more techniques may be merged with or integrated in another technique. Accordingly, each technique should be considered combinable with every other technique. Aspects of each technique may be tuned over time to improve the accuracy of the prediction by tracking predicted next channel selection versus actual next channel selection.

In one embodiment, multiple techniques may be separately used to predict the next channel under each technique and the results of each technique may be combined using a weighting scheme to generate the next channel prediction of block 60. For instance, the result of each technique may be given a weighted score. The score for each predicted next channel may be summed and the highest summed score may be used as the predicted next channel. The following table serves as example of a weighting technique to combine the results separately derived by plural techniques to generate the predicted next channel.

TABLE 1

| Technique No. | Weight | Predicted channel | Weight by predicted channel | | | | |
|---|---|---|---|---|---|---|---|
| | | | Ch. 1 | Ch. 2 | Ch. 3 | Ch. 4 | Ch. 5 |
| 1 | 0.10 | 2 | — | 0.10 | — | — | — |
| 2 | 0.15 | 2 | — | 0.15 | — | — | — |
| 3 | 0.30 | 4 | — | — | — | 0.30 | — |
| 4 | 0.10 | 5 | — | — | — | — | 0.10 |
| 5 | 0.15 | 5 | — | — | — | — | 0.15 |
| 6 | 0.10 | 4 | — | — | — | 0.10 | — |
| 7 | 0.10 | 2 | — | 0.10 | — | — | — |
| Total: | | | 0.00 | 0.35 | 0.00 | 0.40 | 0.25 |

In the example of Table 1, seven techniques are used to make next channel predictions from five possible channels. A weight is assigned to each technique. None of the techniques predicted channel 1 or channel 3 and those channels' overall score is zero. However, three techniques predicted channel 2 having respective weighting scores of 0.10, 0.15 and 0.10 for a total channel 2 score of 0.35. Two techniques predicted channel 4 for a total channel 4 score of 0.40. Two techniques predicted channel 5 for a total channel 5 score of 0.25. In the example, Channel 4's score is higher than the total score of all other channels and may be used as the predicted next channel.

The weighting values may be static or dynamic. Dynamic weighting values may be used to adjust for factors such as of day and/or day of the week, and/or to improve the accuracy of the prediction over time by tracking predicted next channel selection versus actual next channel selection. For example, if one of the techniques is more accurate than the others, the weight for that technique may be increased.

In another embodiment, the channel having the most number of techniques predicting the channel may be used as the predicted channel. Using the example from Table 1, channel 2 has the highest number of predicting techniques.

When weight score is used to predict the channel, a tie between two or more channels having the same score may be broken by using a secondary metric, such as the channel from the tied channels with a higher number of techniques predicting the channel. Similarly, when higher number of techniques is used to predict the channel, a tie between two or more channels having the same number of predicting techniques may be broken by using higher weighted score. As will be appreciated, other tie breaking or hierarchical schemes may be used as part of the prediction process.

With continued reference to FIG. 4, after predicting the channel that the user will select next in block 60 the method may proceed to block 62. In block 62, the data associated with the predicted channel is received and buffered by the mobile telephone 10.

Thereafter, in block 64, a determination may be made as to whether the user has selected a new channel. If a new channel has not been selected (a negative determination in block 64), the method may proceed to block 66. In block 66, aged data that was buffered for the predicted channel is deleted from the buffer 40. After a negative determination in block 64, the aged data may be considered data that is older than a predetermined age. In one embodiment, data that has been buffered for more than about three seconds may be deleted and, in another embodiment, data that has been buffered for more than about four second may be deleted. However, the length of time may be changed to accommodate the buffer 40 capacity of the mobile telephone 10 and/or based on how much time switching from one channel to another channel is known to take for a typical channel switch. In DVB-H systems, channel switching may take up to about three second. Therefore, buffering data for the predicted next channel for about three to about four seconds should be adequate, in most situations, to bridge the time it may take to switch from a previously selected channel to the predicted channel.

After block 66, the method may return to block 56 to continue to receive and buffer data for the currently selected channel, which will be feed to the decoder in block 58. In an iteration of the method where no channel selection change was made in block 64, block 60 may be skipped and the predicted next channel established in an earlier iteration of the method may be retained for subsequent functional blocks.

If, in block 64, the user selects a new channel (a positive determination in block 64), the method may proceed to block 68. In block 68 a determination is made as to whether the newly selected channel is the channel predicted in block 60. If the newly selected channel is not the predicted channel (a negative determination in block 68), the method may proceed to block 66. In block 66, aged data that was buffered for the predicted channel is deleted from the buffer 40. After a negative determination in block 68, the aged data may be considered all data that is associated with the predicted channel as that data is now obsolete. Thereafter, the method may proceed to block 56 for receiving and buffer of data associated with the newly selected channel, decoding of the data (block 58), prediction of a next channel selection (block 60) and so forth.

If, in block 68, the predicted channel was selected by the user (a positive determination in block 68), the method may proceed to block 70. In block 70, data that was buffered in block 62 for the predicted next channel, which is now the currently selected channel, is feed to the decoder 38 for generation of the video signal used to drive the display. Similarly, any buffered audio data associated with the buffered video data may be decoded for broadcasting as sounds or transmission to an accessory for broadcasting as sounds. Thereafter, the method may return to block 56 for continued receipt and buffering of data corresponding to the currently selected channel, decoding of such data (block 58), prediction of a next channel selection (block 60) and so forth.

While the predicting of a next channel consumes computing resources, the buffering of data for the predicted channel consumes buffer capacity and the receiving of data for the predicted channel consumes power, the user's experience may be enhanced by reducing the observable switching time from a currently selected channel to the predicted channel. As will be appreciated, the method may be extended to predict more than one possible channel that the user may select next and buffer data associated with each of the predicted channels.

In cases when the prediction of which channel the user will select next is incorrect, the user may have to wait for the newly selected channel to be received, buffered and decoded as would conventionally occur when switching channels. However, the channel prediction function 22 may be configured to use correct channel predictions and/or incorrect channel predictions to improve future executions of the prediction process.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method of processing video data with an electronic equipment, the video data available from a time-sliced data stream having video data corresponding to each of a plurality of channels, comprising:
   a) receiving video data corresponding to one of the channels from the plurality of channels that is currently selected by the user and driving a display in accordance with the video data corresponding to the currently selected channel;
   b) predicting which one of the remaining channels from the plurality of channels that the user may next select by separately predicting a plurality of predicted next channels with each of plural prediction techniques and designating only one predicted next channel from among the plurality of separately predicted next channels; and
   c) receiving and buffering video data corresponding only to the designated predicted channel from among the plurality of predicted next channels;
   wherein the prediction comprises: performing a first prediction technique from among the plural prediction techniques to predict a first next channel; performing a second prediction technique from among the plural prediction techniques to predict a second next channel; wherein the first or second prediction technique is employed from among the plural prediction techniques based on monitoring a user's behavior; weighting the prediction of the first next channel and the second next channel; and based on a result of the weighting, designating either the first next channel or the second next channel as the only one predicted next channel.

2. The method of claim 1, further comprising, upon user action to switch from the currently selected channel to a newly selected one of the channels, determining if the newly selected channel is the designated predicted channel and:
   if so, driving the display in accordance with the buffered data corresponding to the designated predicted channel, repeating a) using the designated predicted channel as the currently selected channel and repeating b) and c); else
   repeating a) using the newly selected channel as the currently selected channel and repeating b) and c).

3. The method of claim 1, wherein at least one of the plural prediction techniques uses a channel selected immediately before the currently selected channel as the predicted next channel.

4. The method of claim 1, wherein at least one of the plural prediction techniques includes monitoring user channel selection behavior for patterns in channel selection.

5. The method of claim 1, wherein at least one of the plural prediction techniques includes monitoring accumulated view time of each channel.

6. The method of claim 1, wherein at least one of the plural prediction techniques includes monitoring a frequency with which the user selects each channel.

7. The method of claim 1, wherein at least one of the plural prediction techniques uses content of the video data associated with each channel to determine the predicted next channel.

8. The method of claim 1, wherein at least one of the plural prediction techniques includes reducing a possible number of potential predicted next channels using a configuration of a user interface for selecting a next channel.

9. The method of claim 1, wherein at least one of the plural prediction techniques uses channel popularity ratings to determine the predicted next channel.

10. The method of claim 1, wherein the predicting includes calculating a weighted score for results of each of the plural prediction techniques, summing the weighted scores, and designating the predicted channel to be the channel with the highest sum of the weighted scores from among the plurality of predicted next channels.

11. The method of claim 10, wherein the predicting further includes adjusting the weighting scores over time to account for a relative accuracy of each of the plural prediction techniques.

12. An electronic equipment, comprising:
   a receiver for receiving video data corresponding to a channel selected by a user from a plurality of channels, each channel having corresponding video data available from a time-sliced data stream;
   a display for displaying video content in accordance with the video data corresponding to the currently selected channel;
   a controller for predicting which one of the remaining channels from the plurality of channels that the user may next select by separately predicting a plurality of predicted next channels with each of plural prediction techniques and designating only one predicted next channel from among the plurality of separately predicted next channels; and
   a buffer for buffering video data corresponding only to the designated predicted channel from among the plurality of predicted next channels;
   wherein the prediction comprises: performing a first prediction technique from among the plural prediction techniques to predict a first next channel; performing a second prediction technique from among the plural prediction techniques to predict a second next channel; wherein the first or second prediction technique is employed from among the plural prediction techniques based on monitoring a user's behavior; weighting the prediction of the first next channel and the second next channel; and based on a result of the weighting, designating either the first next channel or the second next channel as the only one predicted next channel.

13. The electronic equipment of claim 12, wherein the electronic equipment is a mobile telephone.

14. The electronic equipment of claim 12, further comprising a video data decoder configured to decode the buffered video data and generate a video signal corresponding to the buffered video data for the designated predicted channel following a detection of a user input to switch from the currently selected channel to the predicted next channel, the video signal for driving the display.

15. The electronic equipment of claim 12, wherein the predicting by the controller includes calculating a weighted score for results of each of the plural prediction techniques, summing the weighted scores, and designating the predicted channel to be the channel with the highest sum of the weighted scores from among the plurality of predicted next channels.

16. The electronic equipment of claim 15, wherein the predicting by the controller further includes adjusting the weighting scores over time to account for a relative accuracy of each of the plural prediction techniques.

17. A non-transitory machine usable medium storing a program for managing the processing video data with an electronic equipment, the video data available from a time-sliced data stream having video data corresponding to each of a plurality of channels, the program comprising executable logic to:

control a receiver to receive video data corresponding to one of the channels from the plurality of channels that is currently selected by the user and control a decoder to generate a video signal in accordance with the video data corresponding to the currently selected channel for driving a display;

predict which one of the remaining channels from the plurality of channels that the user may next select by separately predicting a plurality of predicted next channels with each of plural prediction techniques and designating only one predicted next channel from among the plurality of separately predicted next channels; and control the receiver to receive video data corresponding only to the designated predicted channel and logic to control a buffer to buffer the video data corresponding to the designated predicted channel from among the plurality of predicted next channels;

wherein the prediction comprises: performing a first prediction technique from among the plural prediction techniques to predict a first next channel; performing a second prediction technique from among the plural prediction techniques to predict a second next channel; wherein the first or second prediction technique is employed from among the plural prediction techniques based on monitoring a user's behavior; weighting the prediction of the first next channel and the second next channel; and based on a result of the weighting, designating either the first next channel or the second next channel as the only one predicted next channel.

18. The non-transitory machine usable medium according to claim 17, further comprising logic to determine if a newly selected channel is the designated predicted channel upon user action to switch from the currently selected channel to a newly selected one of the channels, and, if so, control the decoder to generate a video signal in accordance with the buffered data corresponding to the designated predicted channel.

19. The non-transitory machine usable medium of claim 17, wherein the predicting includes calculating a weighted score for results of each of the plural prediction techniques, summing the weighted scores, and designating the predicted channel to be the channel with the highest sum of the weighted scores from among the plurality of predicted next channels.

20. The non-transitory machine usable medium of claim 19, wherein the predicting further includes adjusting the weighting scores over time to account for a relative accuracy of each of the plural prediction techniques.

\* \* \* \* \*